(12) United States Patent
Suzuki (10) Patent No.: US 9,477,912 B2
(45) Date of Patent: Oct. 25, 2016

(54) PRINTING APPARATUS, INFORMATION PROCESSING APPARATUS AND METHOD FOR CONTROLLING THE INFORMATION PROCESSING APPARATUS, AND STORAGE MEDIUM

(71) Applicant: CANON KABUSHIKI KAISHA, Tokyo (JP)

(72) Inventor: Ryousuke Suzuki, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/664,588

(22) Filed: Mar. 20, 2015

(65) Prior Publication Data

US 2015/0269460 A1 Sep. 24, 2015

(30) Foreign Application Priority Data

Mar. 24, 2014 (JP) ................. 2014-059774

(51) Int. Cl.
*G06K 15/02* (2006.01)
*G06K 15/00* (2006.01)

(52) U.S. Cl.
CPC ....... *G06K 15/1817* (2013.01); *G06K 15/1811* (2013.01); *G06K 15/181* (2013.01); *G06K 15/4095* (2013.01)

(58) Field of Classification Search
None
See application file for complete search history.

(56) References Cited

U.S. PATENT DOCUMENTS

| 5,894,545 A | * | 4/1999 | Fukuta | ................. G06K 15/02 358/1.13 |
| 2006/0092470 A1 | * | 5/2006 | Yamada | ................. G06K 15/00 358/1.16 |
| 2009/0190147 A1 | * | 7/2009 | Uruta | ................. H04N 1/2307 358/1.9 |

FOREIGN PATENT DOCUMENTS

| JP | H09181914 A | 7/1997 |
| JP | 2002029103 A | 1/2002 |
| JP | 2004-038550 A | 2/2004 |
| JP | 2004287763 A | 10/2004 |
| JP | 2006116846 A | 5/2006 |
| JP | 2009-033242 A | 2/2009 |
| JP | 2013-017010 A | 1/2013 |

\* cited by examiner

*Primary Examiner* — Andrew H Lam
(74) *Attorney, Agent, or Firm* — Canon U.S.A., Inc. IP Division (57) ABSTRACT

A printing apparatus 100 performs print processing for a PDF file received via a communication unit 105. The printing apparatus 100 includes a CPU 101 and a HDD 104 storing the PDF file. The CPU 101 controls the HDD 104, secures a storage area corresponding to a maximum size of the PDF file that can be processed by the printing apparatus 100 each time reception of the PDF file is started, and sequentially stores PDF files received for each secured storage area. The CPU 101 updates a size of the secured storage area from the maximum size of the PDF file that can be processed by the printing apparatus 100 to an actual size of the PDF file having been received completely. The CPU 101 performs control so that the PDF files stored in the HDD 104 are processed in an order of reception start.

8 Claims, 6 Drawing Sheets

PRINTING APPARATUS, INFORMATION PROCESSING APPARATUS AND METHOD FOR CONTROLLING THE INFORMATION PROCESSING APPARATUS, AND STORAGE MEDIUM

BACKGROUND OF THE INVENTION

1. Field of the Invention

The present invention relates to a technique for spooling received electronic data to perform print processing.

2. Description of the Related Art

When a document generated by a personal computer is printed, the document is generally converted into Page Description Language (PDL) data, which can be interpreted by a printing apparatus (e.g., printer), which is one type of an information processing apparatus, via a printer driver. The PDL data thus obtained by the conversion is transferred to the printing apparatus. In the printing apparatus, the received PDL data is sequentially interpreted to form bitmap data to be printed on a sheet surface. Thus, the printing apparatus performs printing by interpreting a PDL instruction to convert the PDL instruction into an object rendering instruction.

On the other hand, the generated document may be distributed after being converted into an electronic file in a specific format. Such a format of the electronic file has been widely used by various venders because its specification has been opened to the public.

Particularly, as a mobile data communication device (e.g., personal digital assistant (PDA) device or smartphone) has spread in recent years, it has become common that a document is distributed after being converted into a Portable Document Format (PDF) file. Such a format of an electronic file may include a format configured to previously give several kinds of print setting information in the electronic file. If the printing apparatus supports the electronic file including the print setting information, print processing for the electronic file can be performed without using a printer driver. As a result, the print processing can be performed with the same operation feeling regardless of a type of the printing apparatus. Such a print mode is referred to as a direct print, for example.

Such an electronic file is to be handled differently from the above-mentioned PDL data in some points. For example, in the above-mentioned PDF file, the print processing cannot be started until the reception of the PDF file is completed. This is because in the PDF format, information representing the entire structure of the PDF file is defined to be positioned at the end portion of the file. More specifically, in the printing apparatus, the PDF file cannot be interpreted sequentially according to progress in receiving the PDF file. Therefore, processing for interpreting the PDF file is started after all data are stored (spooled) in a storage in the printing apparatus.

Thus, the printing apparatus requires a storage capacity capable of spooling entire data of at least one PDF file to realize the direct print of the PDF file.

Some recent printing apparatuses may previously include a large-capacity storage for the purpose of storing a plurality of electronic files received for print processing, or assuming a simultaneous operation by a plurality of users. In addition, some printing apparatuses may be configured to mount a portable storage (e.g., memory card such as universal serial bus (USB) memory) thereon and store electronic files in the storage.

If the large-capacity storage is mounted in the printing apparatus, however, manufacturing costs or operational costs may be increased. Therefore, it is desirable that a capacity of the storage to be mounted should be made as small as possible while the direct print function is achieved.

In view of reducing the capacity of the storage, there is provided an image processing apparatus discussed in Japanese Patent Application Laid-Open No. 2004-287763. This image processing apparatus requests a transmission source of an electronic file to convert the electronic file into a data format that can be sequentially processed, when the size of a usable storage becomes a predetermined size or less.

Requesting the transmission source to convert the electronic file into the data format that can be sequentially processed results in time and effort similar to those taken to install a printer driver into an apparatus serving as the transmission source of the electronic file. Further, communication traffic increases because both the electronic file and data obtained by the conversion are transmitted.

On the other hand, a general printing apparatus starts to generate an internal job (print job) at a timing of starting to receive print data. More specifically, the printing apparatus starts to generate the job at a timing of starting a network session for receiving the above-mentioned electronic file. Similarly, when the printing apparatus receives another electronic file while executing the job, for example, it also starts to generate a new job.

The printing apparatus receives each electronic file independently.

Therefore, the printing apparatus may complete receiving an electric file of a subsequent job earlier than an electric file of a preceding job. Here, the preceding job is a job started to be received earlier and the subsequent job is a job started to be received later. In such a situation, if a storage capacity for storing the electronic file in the preceding job is depleted (capacity shortage), the following problem may occur.

1. When the Subsequent Job is Subjected to Print Processing Earlier.

In the general printing apparatus, jobs are subjected to print processing in the order of being generated. More specifically, the electronic files are subjected to print processing in the order of reception start. If the subsequent job is subjected to print processing earlier, exceptional processing needs to be performed separately. If large amounts of small-sized PDF files are input (received), the print processing for the preceding job may not be started until the print processing for all the input PDF files is completed.

2. When the Subsequent Job is Canceled.

In this case, a mobile data communication device, which has transmitted the electronic file of the subsequent job, cannot be notified that the print job including the input (received) electronic file has been canceled because communication with the mobile data communication device has ended.

To cope with the above-mentioned problem, the number of jobs to be concurrently processed has conventionally been limited. More specifically, the printing apparatus has been configured to previously secure a storage area storing the electronic file at a timing when the reception of the electronic file has been started, reject the reception of the job when the storage area cannot be secured, or wait until the job is completed.

In the printing apparatus thus configured, the data size of the electronic file is unclear when the reception of the electronic file is started. Thus, a storage area corresponding to the maximum size (maximum data size) of the electronic file, which can be processed in the printing apparatus, is secured.

Even if the storage area corresponding to the maximum size of the electronic file that can be processed in the printing apparatus is secured when the reception of the electronic file is started, as described above, the following problem remains. In order to store a plurality of electronic files, a large-capacity storage area needs to previously be secured as an electronic file storage area. If the maximum size of the electronic file that can be processed in the printing apparatus is 2 [GB], for example, a storage area corresponding to the maximum size of 16 {GB} needs to previously be secured to enable the storage of the maximum of eight electronic files. However, the actual size of the electronic file actually received may be smaller than the maximum size described above in many cases. Therefore, there remains a problem that a large part of the storage area previously secured becomes useless.

SUMMARY OF THE INVENTION

The present invention is directed to an information processing apparatus capable of efficiently storing a plurality of electronic data in a storage unit.

According to an aspect of the present invention, an information processing apparatus configured to perform predetermined processing for received electronic data includes a storage unit configured to secure a storage area corresponding to a maximum size of electronic data that can be processed by the information processing apparatus each time reception of the electronic data is started and sequentially store the received electronic data for each secured storage area, an updating unit configured to update a size of the secured storage area from the maximum size of the electronic data that can be processed by the information processing apparatus to an actual size of the electronic data having been received completely, and a control unit configured to perform control so that the electronic data stored in the storage unit are processed in an order of reception start.

Further features of the present invention will become apparent from the following description of exemplary embodiments with reference to the attached drawings.

DESCRIPTION OF THE EMBODIMENTS

Exemplary embodiments in which an information processing apparatus according to the present invention is applied to a printing apparatus will be described in detail below with reference to the drawings. The following exemplary embodiments are not intended to limit the invention as set forth in the claims, and all combinations of features described in the exemplary embodiments are not necessarily essential for a solution according to the present invention.

Figure 1:
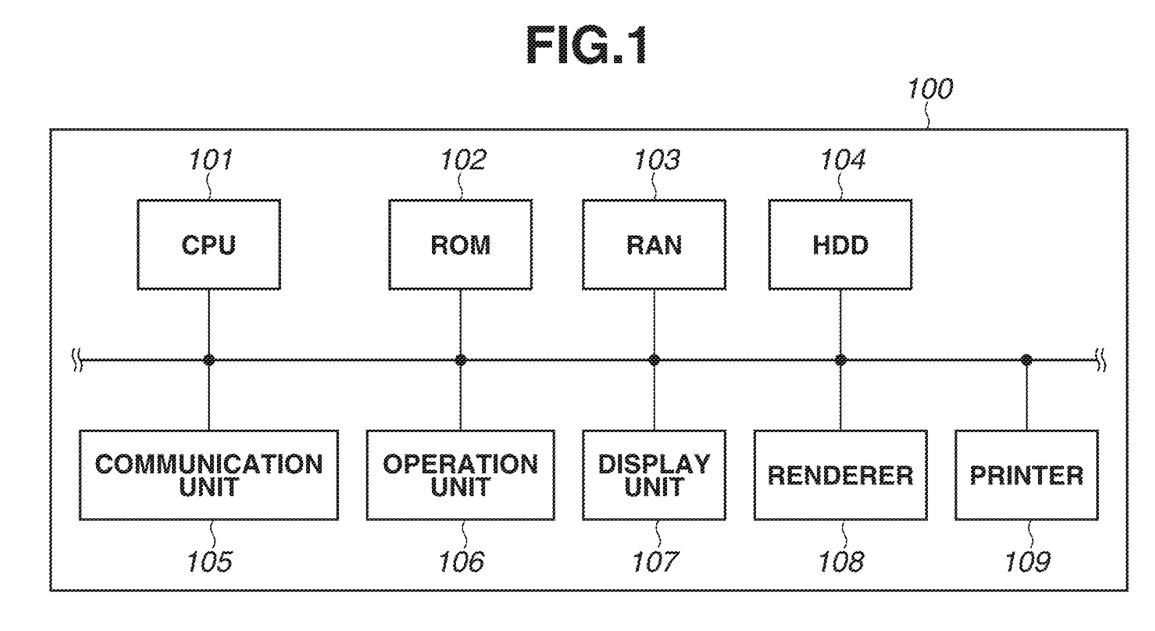
FIG. 1 is a block diagram illustrating an example of principal components of a printing apparatus according to a first exemplary embodiment.

FIG. 1 is a block diagram illustrating an example of principal components of a printing apparatus according to a first exemplary embodiment.

A printing apparatus 100 illustrated in FIG. 1 includes a central processing unit (CPU) 101, a read only memory (ROM) 102, a random access memory (RAM) 103, a hard disk drive (HDD) 104, a communication unit 105, and an operation unit 106. The printing apparatus 100 further includes a display unit 107, a renderer 108, and a printer 109.

The CPU 101 reads out control programs respectively stored in the ROM 102 and the HDD 104, to control the entire printing apparatus 100. The ROM 102 stores various types of information such as the control program. The RAM 103 is used as a temporary storage area such as a main memory and a work area in the CPU 101.

The HDD 104 stores various types of information such as the control program to be executed by the CPU 101 and a PDF file serving as a printing target. The HDD 104 functions as a storage unit configured to store the PDF file, which will be described below.

The communication unit 105 communicates with an external device such as a personal computer (PC) or a mobile data communication device (not illustrated). Various forms such as a local area network (LAN), the Internet, and wireless communication can be used for communication with the external device via the communication unit 105.

The operation unit 106 is a keyboard, for example, and transmits information input by a user to the CPU 101.

The display unit 107 displays an operation screen of the printing apparatus 100 or an error screen in job processing. In the present exemplary embodiment, the operation unit 106 and the display unit 107 are described as being separately configured. The present invention is not limited thereto. The operation unit 106 and the display unit 107 may also be integrally configured by using a liquid crystal panel having a touch panel function, for example.

The renderer 108 generates bitmap image data based on a display list (intermediate data) generated by the CPU 101 interpreting electronic data input from the external device via the communication unit 105. The renderer 108 outputs the generated bitmap image data to the RAM 103 or the HDD 104. Details of the display list will be described below.

The printer 109 performs print processing for forming an image on a sheet based on the bitmap image data stored in the RAM 103, or the like.

In the present exemplary embodiment, the electronic data input (received) from the external device via the communication unit 105 is described as PDF data (PDF file). The PDF file, which has been received by the printing apparatus 100, is described as being stored in a predetermined storage area in the HDD 104. The PDF file is transmitted to the printing apparatus 100 from the external device according to a protocol such as Line Printer Daemon protocol (LPD) and Read After Write (RAW).

Figure 2:
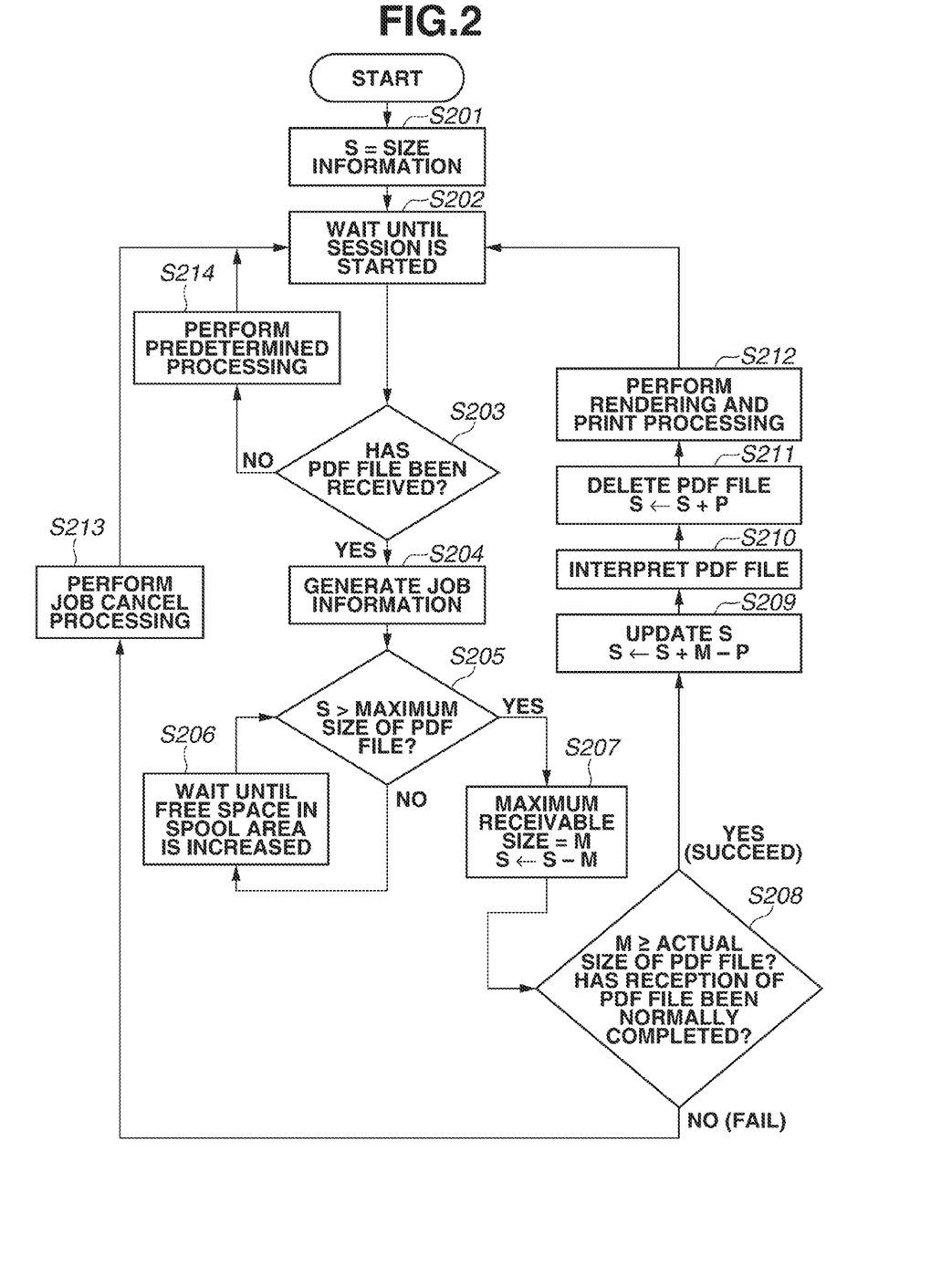
FIG. 2 is a flowchart illustrating an example of a processing procedure performed by the printing apparatus.

FIG. 2 is a flowchart illustrating an example of a processing procedure performed by the printing apparatus 100 according to the present exemplary embodiment. Each processing in steps S201 to S214 illustrated in FIG. 2 is mainly performed by the CPU 101 loading a program stored in a memory such as the ROM 102 into the RAM 103 and executing the program. The printing apparatus 100 receives electronic data (e.g., PDF file) transmitted from the external device, and performs predetermined processing (print processing) for the electronic data, the reception of which has been completed.

In step S201, the CPU 101 calculates the total size of a storage area (spool area) storing a PDF file previously secured in the HDD 104, and sets a calculation result to size information S. The CPU 101 thus functions as a calculation unit. The size information S is information representing a free space in the storage area, and is stored in the RAM 103, for example.

In step S202, the CPU 101 waits until network communication with the outside via the communication unit 105 is started (a session is started). Each processing in step S202 and the subsequent steps is a job to be concurrently executed each time the network communication with the outside via the communication unit 105 is started. More specifically, in the printing apparatus 100, a plurality of jobs (print jobs) is concurrently executed.

The CPU 101 is triggered by having detected a communication request from the outside via the communication unit 105, to start processing for receiving electronic data, and store the received electronic data in the RAM 103. In step S203, the CPU 101 analyzes the electronic data stored in the RAM 103, and determines whether the electronic data is a PDF file. An initial position of the PDF file is previously specified as "% PDF-". Therefore, the CPU 101 determines whether the electronic data is the PDF file by examining the head of the electronic data even before the reception is completed.

If the CPU 101 determines that the electronic data is the PDF file (YES in step S203), the operation proceeds to step S204. Otherwise (NO in step S203), the operation proceeds to step S214. In step S214, the CPU 101 performs processing corresponding to the received electronic data. More specifically, the processing in step S214 is print processing for the PDL data, for example.

In step S204, the CPU 101 generates job information serving as management information for performing the print processing for the PDF file. The job information is information to which an identifier to be unique in the printing apparatus 100 is assigned, and includes link information to information representing various types of print settings and a printing state, for example. The generated job information is stored in the RAM 103, for example.

In step S205, the CPU 101 compares the maximum size of the PDF file, which can be processed in the printing apparatus 100, with the size information S stored in the RAM 103, and determines whether the size information S is more than the maximum size of the PDF file that can be processed in the printing apparatus 100.

For example, the maximum size of the PDF file, which can be processed in the printing apparatus 100, is a maximum size (e.g., 2 [GB]) in which the PDF file can be interpreted with the program stored in the memory such as the ROM 102. The maximum size of the PDF file, which can be processed in the printing apparatus 100, is previously set depending on the processing capability of the printing apparatus 100.

If the CPU 101 determines that the size information S is more than the maximum size of the PDF file that can be processed in the printing apparatus 100 (YES in step S205), the operation proceeds to step S207. Otherwise (NO in step S205), the operation proceeds to step S206.

In step S207, the CPU 101 sets the maximum size of the PDF file, which can be processed in the printing apparatus 100, to a maximum receivable size M, and resets a value obtained by subtracting the maximum receivable size M from the size information S to the size information S. The maximum receivable size M is information set for each job. The maximum receivable size M according to the present exemplary embodiment is always equal to the maximum size of the PDF file that can be processed in the printing apparatus 100.

The storage area corresponding to the maximum size of the PDF file, which can be processed in the printing apparatus 100, is secured in the HDD 104 by the processing in step S207. In the printing apparatus 100, a plurality of jobs (print jobs) is concurrently executed, and thus the storage area is sequentially secured each time the reception of the PDF file is started.

If the size of the received PDF file is not more than the maximum size of the PDF file that can be processed in the printing apparatus 100, PDF files, which have been received for each secured storage area, can be sequentially stored regardless of whether there is the subsequent job.

The CPU 101 stores (spools) the PDF file, which has been received via the communication unit 105, in the HDD 104 until the maximum size of the PDF file that can be processed in the printing apparatus 100 reaches the maximum receivable size M that has been set in the processing in step S207. Thus, the CPU 101 functions as a storage unit in cooperation with the HDD 104.

In step S208, the CPU 101 sets the actual size of the received PDF file to a file size P. The file size P is information set for each job. In step S208, the CPU 101 further determines whether the actual size of the received PDF file is not more than the maximum receivable size M that has been set in the processing in step S207, i.e., a relationship of the maximum receivable size M≥the file size P holds.

If the actual size of the received PDF file is more than the maximum receivable size M, or reception of the PDF file has failed because a communication error occurs during the reception (NO in step S208), the operation proceeds to step S213. Otherwise, i.e., the reception of the PDF file has succeeded (YES in step S208), the operation proceeds to step S209.

In step S209, the CPU 101 updates the size information S. More specifically, the maximum receivable size M is added to the size information S. Further, a value obtained by subtracting the file size P stored in the HDD 104 in the processing in step S208 from the addition result is reset to the size information S. Thus, the CPU 101 functions as an updating unit. The CPU 101 can recognize the actual size of the PDF file by the completion of the reception of the PDF file. Thus, the CPU 101 is triggered by the completion of the reception of the PDF file, to update the size information S in this case.

By the processing in step S209, the size of the secured storage area becomes the file size P from the maximum receivable size M. Since a relationship of the maximum receivable size M≥the file size P holds, the size information S increases. More specifically, a free space is increased by updating the size of the storage area from the maximum size to the actual size. As a result, the increased area can be used in the subsequent job.

In step S210, the CPU 101 interprets the PDF file (spooled data), which has been stored in the HDD 104 in the processing in step S208, and thus generates a display list. The generated display list is intermediate data for generating bitmap image data. The display list is stored in the RAM 103, for example.

In step S211, the CPU 101 deletes the PDF file, for which the display list has been generated, from the HDD 104, and resets a value obtained by adding the file size P to the size information S to the size information S. More specifically, a free space is increased by the updating for deleting the PDF file from the HDD 104, i.e., the updating for adding the file size P to the size information S. As a result, the increased area can be used in the subsequent job.

In step S212, the CPU 101 interprets the display list via the renderer 108, and thus generates bitmap image data and outputs the generated bitmap image data to the RAM 103 (or the HDD 104). In step S212, the CPU 101 further performs print processing for printing a bitmap image on a sheet via the printer 109.

The CPU 101 is triggered by the completion of a series of print processing, to delete the job information, which has been generated in the processing in step S204, from the RAM 103, and the operation then returns to step S202.

If the size information S is less than the maximum size M (NO in step S205), then in step S206, the CPU 101 waits until the processing in step S209 or step S211 is performed for the other job that is being concurrently executed. More specifically, in this case, a storage area corresponding to the maximum size of the PDF file, which can be processed in the printing apparatus 101, cannot be secured in the HDD 104. Therefore, the CPU 101 waits until the free space is increased after the size information S is updated. For example, the size information S is updated when the processing in step S209 is performed. In step S205, the CPU 101 compares again the maximum size of the PDF file, which can be processed in the printing apparatus 100, with the size information S stored in the RAM 103 when the processing in step S209 or step S211 is performed.

If the reception of the PDF file or the storage of the PDF file in the HDD 104 has failed, for example (NO in step S208), then in step S213, the CPU 101 performs job cancel processing. More specifically, if the PDF file, which has been received halfway, is stored in the HDD 104, the CPU 101 deletes the PDF file, and performs processing for ending the job corresponding to the job information that has been generated in the processing in step S204. Then, the operation returns to step S202.

Figure 3:
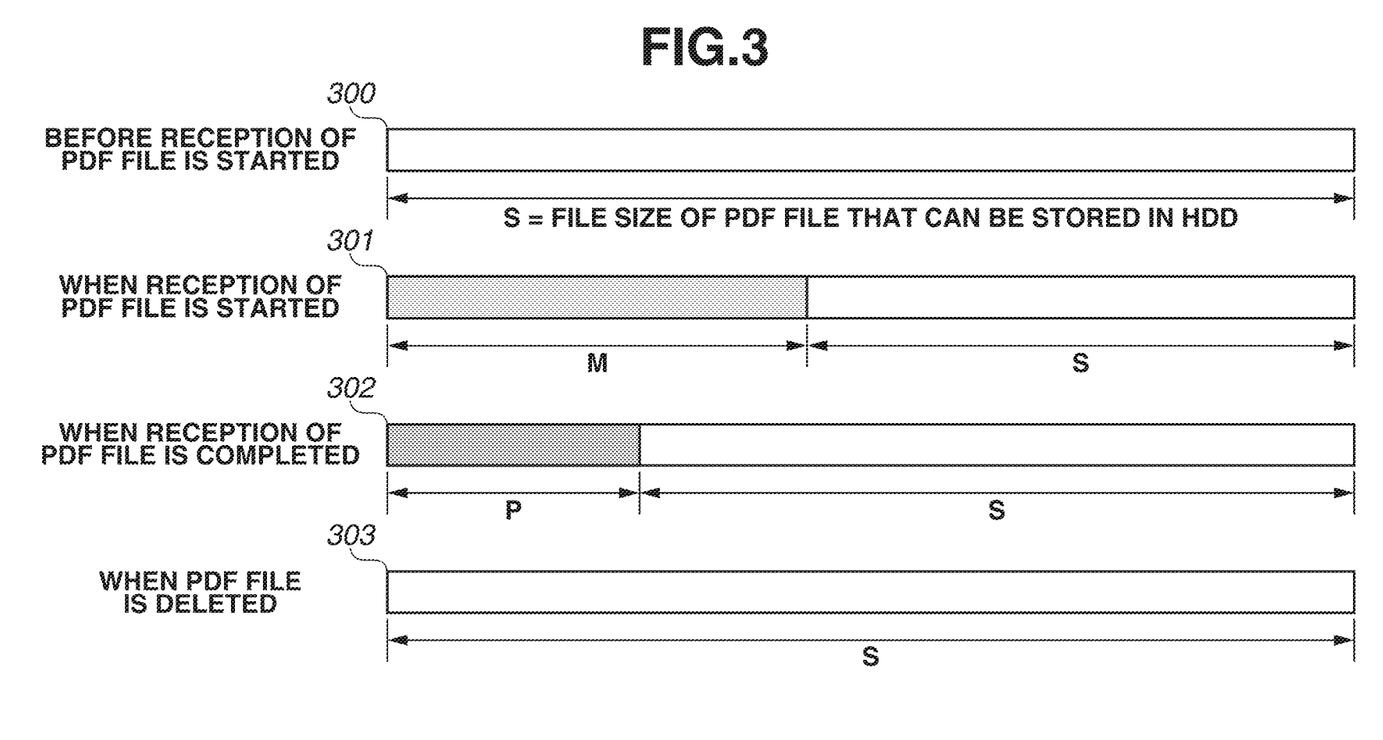
FIG. 3 illustrates a state of a storage area in a hard disk drive (HDD) while performing processing in step S202 to step S209 illustrated in FIG. 2.

FIG. 3 illustrates a state of a storage area storing a PDF file, which has been previously secured in the HDD 104, in the processing in step S202 to step S209 illustrated in FIG. 2. More specifically, FIG. 3 illustrates a state of the storage area where the CPU 101 has not received, since it received one PDF file via the communication unit 105 in the processing in step S202 described with reference to FIG. 2, another PDF file until the processing in step S209.

A state 300 illustrated in FIG. 3 represents a state of the storage area storing the PDF file before the reception of the PDF file is started and a completely empty state.

A state 301 illustrated in FIG. 3 represents a state of the storage area when the reception of the PDF file is started. More specifically, the state 301 is a state of the storage area when a value obtained by subtracting a maximum receivable size M from the size information S is reset to the size information S by the processing in step S207 illustrated in FIG. 2. If the size of a free space in the storage area is the maximum size M or more, the size information S decreases by the maximum size M.

A state 302 illustrated in FIG. 3 represents a state of the storage area when the reception of the PDF file is completed. More specifically, the state 302 is a state of the storage area when the maximum receivable size M is added to the size information S and a value obtained by subtracting the file size P stored in the HDD 104 from an addition result is reset to the size information S by the processing in step S209 illustrated in FIG. 2. Since a relationship of the maximum receivable size M≥the file size P holds, the size information S increases, as seen from the state 301 to the state 302.

A state 303 illustrated in FIG. 3 represents a state of the storage area when the PDF file is deleted from the HDD 104. More specifically, the state 303 is a state of the storage area when a value obtained by adding the file size P to the size information S is reset to the size information S by the processing in step S211 illustrated in FIG. 2. Thus, the generation of the display list is completed, and the PDF file is deleted from the HDD 104 so that the entire storage area storing the PDF file returns to an empty state. These points will be described below with a specific example.

Figure 4:
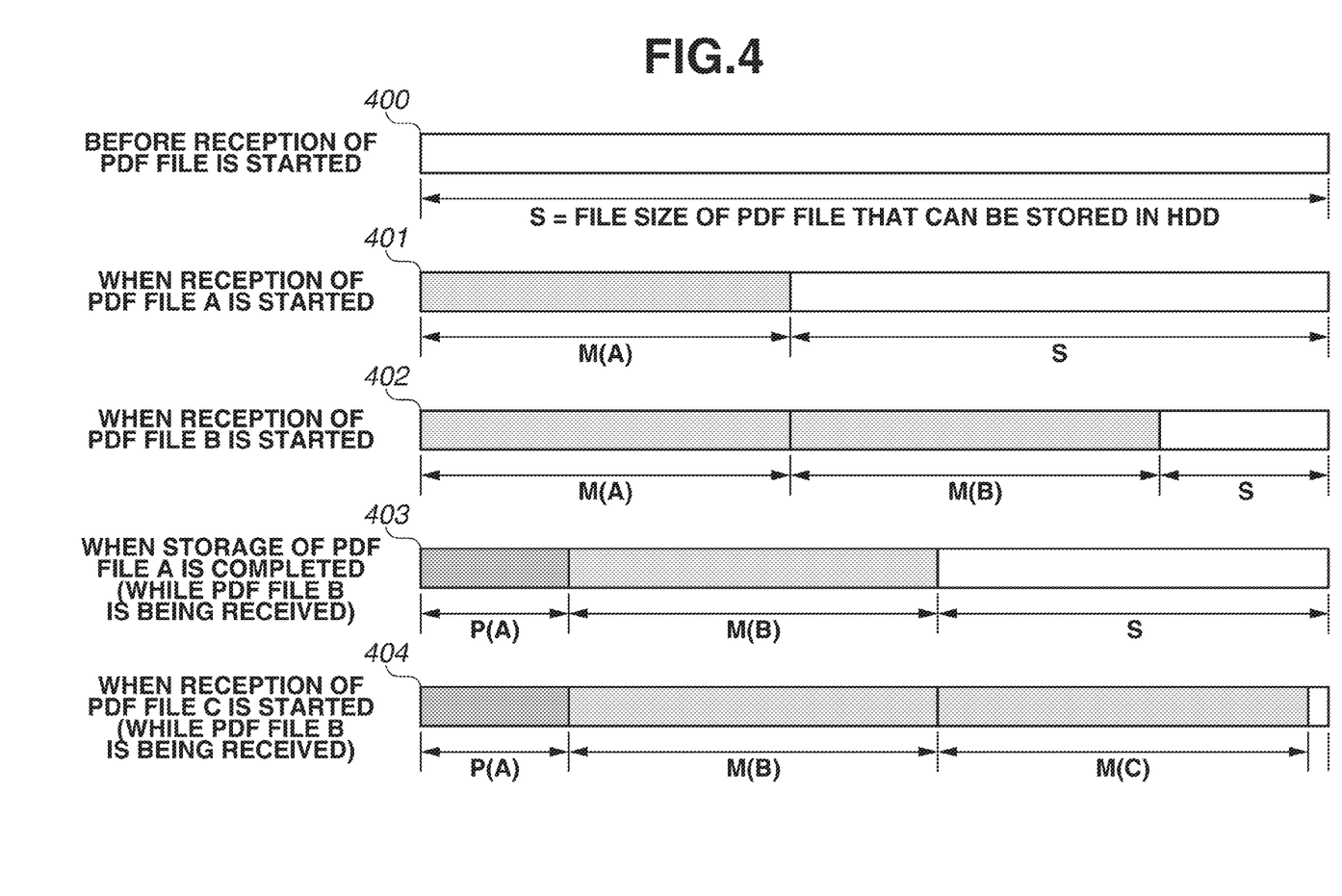
FIG. 4 illustrates a state of the storage area in the HDD when three PDF files are received.

FIG. 4 illustrates a state of a storage area in the HDD 104 when three PDF files are received. The three PDF files to be received will be described as a PDF file A, a PDF file B, and a PDF file C.

The reception of the PDF file A is started when none of PDF files has yet been transmitted to the printing apparatus 100. The reception of the PDF file B is started before the storage of the PDF file A in the HDD 104 is completed, i.e., before the processing in step S209 illustrated in FIG. 2. The reception of the PDF file C is started when the storage of the PDF file A in the HDD 104 is completed and before the storage of the PDF file B is completed.

A state 400 illustrated in FIG. 4 represents a state of the storage area storing the PDF file before the reception of the PDF file is started and a completely empty state.

A state 401 illustrated in FIG. 4 represents a state of the storage area when the reception of the PDF file A is started. More specifically, the state 401 is a state of the storage area when a value obtained by subtracting a maximum receivable size M (A) from the size information S is reset to the size information S by the processing in step S207 illustrated in FIG. 2.

A state 402 illustrated in FIG. 4 represents a state of the storage area when the reception of the PDF file B is started while the PDF file A is being received. More specifically, the state 402 is a state of the storage area when a value obtained by subtracting the maximum receivable size M (A) and a maximum receivable size M (B) from the size information S is reset to the size information S.

A state 403 illustrated in FIG. 4 represents a state of the storage area when the storage of the PDF file A in the HDD 104 is completed while the PDF file B is being received. More specifically, the state 403 is a state of the storage area when the maximum receivable size M (B) is added to the size information S and a value obtained by subtracting a file size P (A) stored in the HDD 104 from an addition result is further reset to the size information S.

A state 404 illustrated in FIG. 4 represents a state of the storage area when the storage of the PDF file A in the HDD 104 is completed and the reception of the PDF file C is started while the PDF file B is being received. More specifically, the state 404 is a state of the storage area when the maximum receivable size M (B) and a maximum receivable size M (C) are added to the size information S and a value obtained by subtracting the file size P (A) stored in the HDD 104 from an addition result is reset to the size information S.

The size information S illustrated in FIG. 4 is updated at the time when the reception of the PDF file is completed (step S209 in FIG. 2) and at the time when the interpretation of the PDF file ends (step S211 in FIG. 2). Even if the size of the storage area in the HDD 104 is not three times as large as the maximum size M, the three PDF files A, B, and C can be stored. Further, the reception of the subsequent job can be started before the preceding job is completed. Thus, the jobs can be concurrently executed in the printing apparatus 100.

Thus, in the printing apparatus 100 according to the present exemplary embodiment, the size information S representing the size of the storage area storing the PDF file in the HDD 104 is updated according to a reception state and an interpretation state of the PDF file. As a result, the PDF files can be subjected to the print processing in the order of being received, i.e., in the order of generation of job information while a plurality of electronic data (PDF files) can be efficiently stored in the storage (HDD 104).

The printing apparatus 100 according to the first exemplary embodiment has been described using an example of a configuration in which the storage area (the maximum size M) corresponding to the maximum size of the PDF file, which can be processed in the printing apparatus 100, is secured in the HDD 104 when the size information S is the maximum size M or more. The present invention is not limited thereto. If the size information S is less than the maximum size M, or more specifically, if the size information S is more than zero, a storage area storing a PDF file may be secured. A printing apparatus thus configured will be described with reference to FIGS. 5 and 6.

A configuration of the printing apparatus according to a second exemplary embodiment is similar to the configuration of the printing apparatus 100 described in the first exemplary embodiment, and thus description thereof is omitted.

Figure 5:
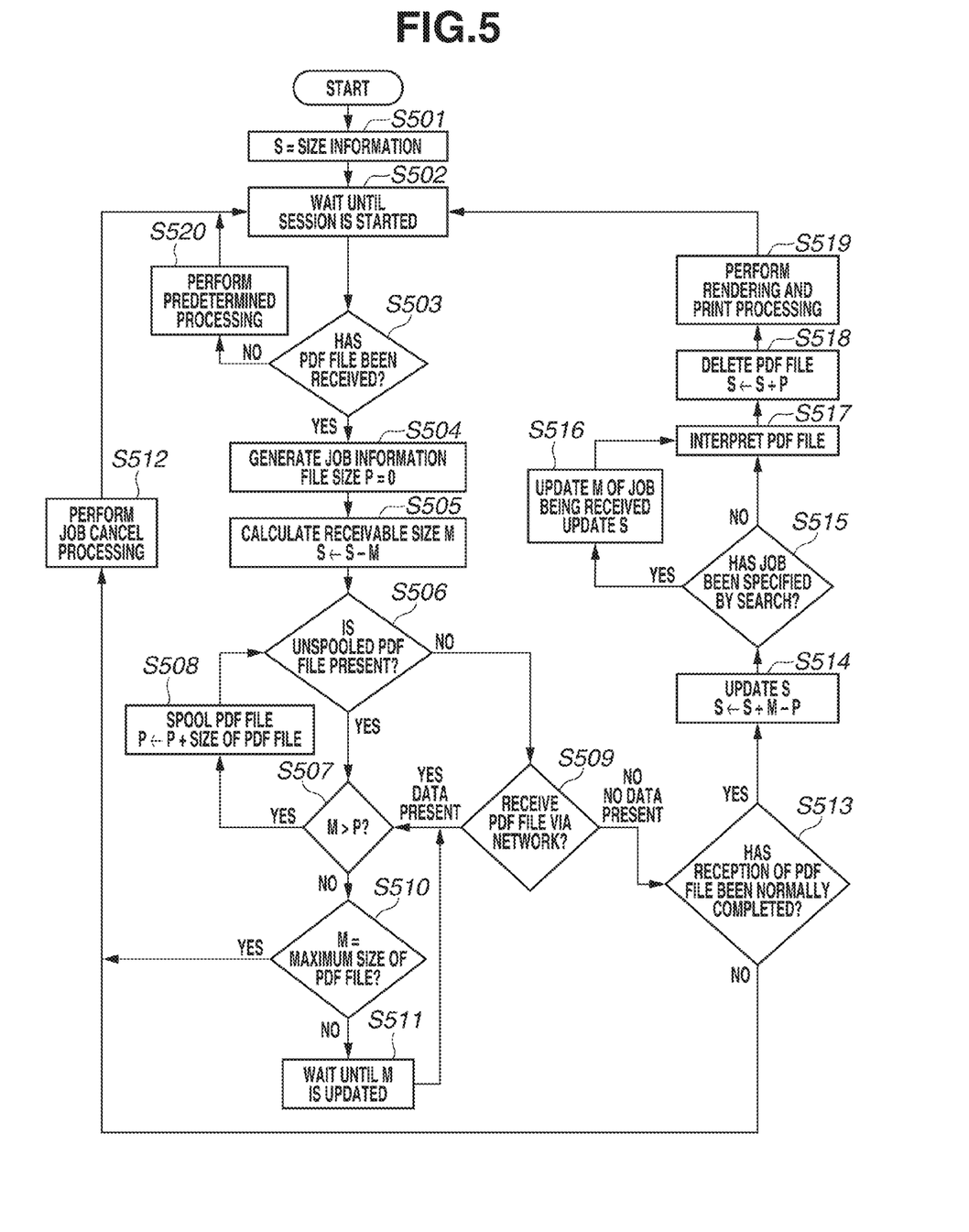
FIG. 5 is a flowchart illustrating an example of a processing procedure performed by a printing apparatus according to a second exemplary embodiment.

FIG. 5 is a flowchart illustrating an example of a processing procedure performed by the printing apparatus 100 according to the present exemplary embodiment. Each processing in steps S501 to S520 illustrated in FIG. 5 is mainly performed by a CPU 101 loading a program stored in a memory such as a ROM 102 into a RAM 103 and executing the program. The printing apparatus receives electronic data (e.g. PDF file) transmitted from an external device, and performs predetermined processing (print processing) for the electronic data, the reception of which has been completed.

In step S501, the CPU 101 sets the total size of a storage area (spool area) storing a PDF file previously secured in a HDD 104 to size information S. The size information S is information representing a free space in the storage area, and is stored in the RAM 103, for example. In step S502, the CPU 101 waits until network communication with the outside via a communication unit 105 is started (a session is started).

Each processing in step S502 and the subsequent steps is a job to be concurrently executed each time the network communication with the outside via the communication unit 105 is started. More specifically, in the printing apparatus 100, a plurality of jobs (print jobs) is concurrently executed.

The CPU 101 is triggered by having detected a communication request from the outside via the communication unit 105, to start processing for receiving electronic data, and store the received electronic data in the RAM 103. In step S503, the CPU 101 analyzes the electronic data stored in the RAM 103, and determines whether the electronic data is a PDF file. An initial position of the PDF file is previously specified as "% PDF-". Therefore, the CPU 101 can determine whether the electronic data is the PDF file by examining the head of the electronic data even before the reception is completed.

If the CPU 101 determines that the electronic data is the PDF file (YES in step S503), the operation proceeds to step S504. Otherwise (NO in step S503), the operation proceeds to step S520. In step S520, the CPU 101 performs processing corresponding to the received electronic data. More specifically, the processing in step S214 is the print processing for the PDL data, for example.

In step S504, the CPU 101 generates job information serving as management information for performing the print processing for the PDF file. The job information is information to which an identifier to be unique in the printing apparatus 100 is assigned, and includes link information to information representing various types of print settings and a printing state, for example. The generated job information is stored in the RAM 103, for example.

In step S504, the CPU 101 further initializes a file size P representing the actual size of the received PDF file to zero. The file size P is information set for each job.

In step S505, the CPU 101 calculates a receivable size M. More specifically, the CPU 101 compares the maximum size of the PDF file, which can be processed in the printing apparatus 100, with the latest size information S, and sets the smaller value of the two values to the receivable size M. The receivable size M is information set for each job.

In step S505, the CPU 101 resets a value obtained by subtracting the receivable size M from the size information S to the size information S. More specifically, a free space, which can be used in the subsequent job, is reduced. A plurality of jobs (print jobs) is concurrently executed so that the storage area is sequentially secured each time the reception of the PDF file is started.

In step S506, the CPU 101 determines whether the received PDF file (unspooled data), which has not yet been stored in the HDD 104, is present in the RAM 103. If the CPU 101 determines that the unspooled PDF file is present (YES in step S506), the operation proceeds to step S507. Otherwise (NO in step S506), the operation proceeds to step S509.

In step S507, the CPU 101 compares the receivable size M with the file size P. If the receivable size M is more than the file size P as a result of the comparison (YES in step S507), then in step S508, the CPU 101 stores a part or the whole of the received PDF file in the RAM 103, in the HDD 104. In step S508, the CPU 101 adds the size of the received PDF file stored in the HDD 104 to the file size P, and thus resets the file size P. Then, the operation returns to step S506. Otherwise (NO in step S507), the operation proceeds to step S510.

If the unspooled PDF file is not present (NO in step S506), then in step S509, the CPU 101 continues to receive the PDF file via the communication unit 105 (via a network). If the CPU 101 has received the subsequent PDF file (YES in step S509), the CPU 101 stores the received PDF file in the RAM 103, and then the operation proceeds to step S507. Otherwise (NO in step S509), the operation proceeds to step S513.

In step S513, the CPU 101 determines whether the reception of the PDF file via the communication unit 105 has been normally completed. If the CPU 101 determines that the reception of the PDF file has been normally completed (YES in step S513), the operation proceeds to step S514. Otherwise (NO in step S513), e.g., if a network error has occurred, the operation proceeds to step S512. The processing in step S512 is similar to the processing in step S213 illustrated in FIG. 2, and thus description thereof is omitted.

In step S514, the CPU 101 updates the size information S. More specifically, the CPU 101 adds the maximum receivable size M to the size information S, and further resets a value obtained by subtracting the file size P from an addition result to the size information S.

By the processing in step S514, the size of the secured storage area becomes the file size P from the maximum receivable size M. Since a relationship of the maximum receivable size M≥the file size P holds, the size information S increases. More specifically, a free space is increased by updating the size of the storage area from the maximum size to the actual size. As a result, the increased area can be used in the subsequent job.

The CPU 101 refers to the job information stored in the RAM 103, and searches for all the jobs in which the PDF file has not yet been stored in the HDD 104. In step S515, the CPU 101 further searches, from among the jobs specified by the search, for the job in which the receivable size M is less than the maximum size of the PDF file that can be processed by the printing apparatus 100, and determines whether the job has been specified. If the job has been specified by the search (YES in step S515), then in step S516, the CPU 101 adds a predetermined value to the receivable size M of the specified job, and thus updates the receivable size M. The maximum value of the predetermined value to be added to the receivable size M is the size information S. More specifically, a free space, which has been increased by the updating, is added to the receivable size M.

In step S516, the CPU 101 further resets a value obtained by subtracting the predetermined value, which has been added to the receivable size M, from the size information S to the size information S.

While the processing in step S514 to step S517 is being performed, the CPU 101 performs control so that the processing in step S505 is not concurrently performed. This control is not to receive a new job before the processing in step S516 is performed after the size information S has increased in the processing in step S514.

If the job has not been specified by the search (NO in step S515) or if the processing in step S516 has been completed, then in step S517, the CPU 101 interprets the PDF file (spooled data) stored in the HDD 104, and thus generates a display list. The generated display list is stored in the RAM 103. In step S518, the CPU 101 deletes the PDF file, for which the display list has been generated, from the HDD 104, and then resets a value obtained by adding the file size P to the size information S to the size information S. More specifically, a free space is increased by the updating for deleting the PDF file from the HDD 104, i.e., the updating for adding the file size P to the size information S. As a result, the increased area can be used in the subsequent job.

In step S519, the CPU 101 interprets the display list via a renderer 108, and thus generates bitmap image data and outputs the generated bitmap image data to the RAM 103 (or the HDD 104). In step S519, the CPU 101 further performs print processing for printing a bitmap image on a sheet via a printer 109.

The CPU 101 is triggered by the completion of a series of print processing, to delete the job information, which has been generated in the processing in step S504, and the operation then returns to step S502.

In step S510, the CPU 101 determines whether the receivable size M is equal to the maximum size of the PDF file that can be processed in the printing apparatus 100. If the CPU 101 determines that the receivable size M is equal to the maximum size of the PDF file that can be processed in the printing apparatus 100 (YES in step S510), the operation proceeds to step S512. More specifically, in this case, the CPU 101 receives a PDF file, the size of which is not less than the maximum size of the PDF file that can be processed in the printing apparatus 100, and cancels the job. Otherwise (NO in step S510), the operation proceeds to step S511. In step S511, the CPU 101 waits until the processing in step S516 is performed for the other job that is being concurrently executed so that the receivable size M is updated. Then, when the receivable size M has been updated, the operation returns to step S507.

Figure 6:
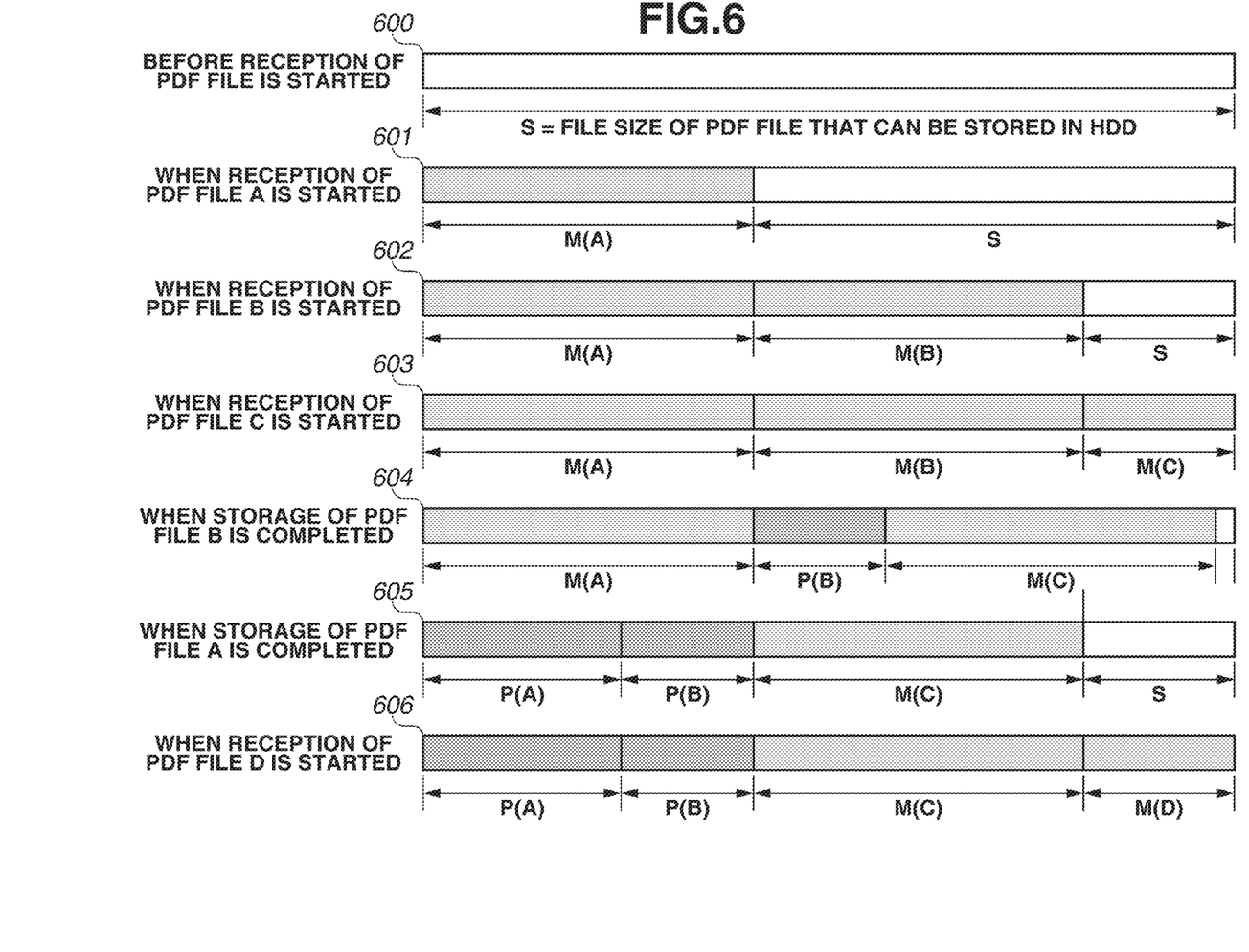
FIG. 6 illustrates a state of the storage area in the HDD when four PDF files are received.

FIG. 6 illustrates a state of a storage area in the HDD 104 when four PDF files are received. The four PDF files to be received will be described as a PDF file A, a PDF file B, a PDF file C, and a PDF file D.

The reception of the PDF file A is started when none of PDF files has yet been transmitted to the printing apparatus 100. The reception of the PDF file B is started before the storage of the PDF file A in the HDD 104 is completed, i.e., before the processing in step S513 illustrated in FIG. 5, and is completed earlier than the reception of the PDF file A. The reception of the PDF file C is started before the storage of each of the PDF file A and the PDF file B in the HDD 104 is completed. The reception of the PDF file D is started when the storage of the PDF file A in the HDD 104 is completed and before the storage of the PDF file C is completed.

A state 600 illustrated in FIG. 6 represents a state of the storage area storing the PDF file before the reception of the PDF file is started and a completely empty state.

A state 601 illustrated in FIG. 6 represents a state of the storage area when the reception of the PDF file A is started. In this case, a receivable size M (A) for the PDF file A is equal to the maximum size of the PDF file that can be processed in the printing apparatus 100.

A state 602 illustrated in FIG. 6 represents a state of the storage area when the reception of the PDF file B is started while the PDF file A is being received. In this case, a receivable size M (B) for the PDF file B is equal to the maximum size of the PDF file that can be processed in the printing apparatus 100.

A state 603 illustrated in FIG. 6 represents a state of the storage area when the reception of the PDF file C is started while the PDF files A and B are being received. In this case, a receivable size M (C) for the PDF file C is obtained by subtracting the receivable size M (A) and the receivable size M (B) from the size information S. Therefore, the receivable size M (C) is less than the maximum size of the PDF file that can be processed in the printing apparatus 100.

A state 604 illustrated in FIG. 6 represents a state of the storage area when the storage of the PDF file B in the HDD 104 is completed while the PDF files A and C are being received. In this case, the receivable size M (C) increases to the maximum size of the PDF file that can be processed in the printing apparatus 100 by the processing in step S516 illustrated in FIG. 5.

A state 605 illustrated in FIG. 6 represents a state of the storage area when the storage of the PDF file A in the HDD 104 is completed while the PDF file C is being received. A state 606 illustrated in FIG. 6 represents a state of the storage area when the reception of the PDF file D is started while the PDF file C is being received.

Thus, in the printing apparatus 100 according to the present exemplary embodiment, control is performed so that the jobs including the receivable size M, which is less than the maximum size of the PDF file that can be processed in the printing apparatus 100, among the jobs to be concurrently executed, are not simultaneously present, i.e., the number of such jobs is one or zero.

Thus, the PDF files are subjected to the print processing in the order of being received, i.e., in the order of generation of job information while a plurality of electronic data (PDF files) can be efficiently stored in the storage (HDD 104).

According to the present exemplary embodiment, the electronic data is subjected to predetermined processing (e.g., print processing) in the order of reception start while the sizes of the secured storage areas are sequentially updated. Therefore, the plurality of electronic data can be efficiently stored in the storage unit.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-059774 filed Mar. 24, 2014, which is hereby incorporated by reference herein in its entirety.

What is claimed is:

1. An information processing apparatus configured to perform predetermined processing for received electronic data, comprising:
    a storage unit configured to secure a storage area corresponding to a maximum size of the electronic data that is set to be processed by the information processing apparatus after reception of the electronic data is started and sequentially store the received electronic data for each secured storage area;
    an updating unit configured to update the size of the secured storage area from the maximum size of the electronic data that is set to be processed by the information processing apparatus to an actual size of the electronic data having been received completely; and
    a calculation unit configured to calculate a free space in the storage unit,
    wherein the calculation unit calculates the free space after the updating by the updating unit, and
    wherein the storage unit secures the storage area in a case where a size of the free space after the updating calculated by the calculation unit is not less than the maximum size of the electronic data that is set to be processed by the information processing apparatus,
    wherein the storage unit does not secure the storage area until the size of the free space becomes not less than the maximum size of the electronic data that is set to be processed by the information processing apparatus by the updating by the updating unit.

2. The information processing apparatus according to claim 1, further comprising a generation unit configured to generate intermediate data for the predetermined processing,
    wherein the updating unit performs, after the generation unit generates the intermediate data, updating to delete the electronic data corresponding to the generated intermediate data from the storage unit.

3. The information processing apparatus according to claim 1,
    wherein the storage unit is triggered by the start of the reception of the electronic data, to secure the storage area corresponding to the maximum size of the electronic data that is set to be processed by the information processing apparatus, and
    wherein the updating unit is triggered by the completion of the reception of the electronic data, to update the size of the secured area from the maximum size of the electronic data that is set to be processed by the information processing apparatus to the actual size of the electronic data having been received completely.

4. The information processing apparatus according to claim 1, further comprising a control unit configured to perform control so that the electronic data stored in the storage unit are processed in an order of reception start.

5. A printing apparatus that executes a print job for received electronic data, comprising:
    a storage unit configured to secure a storage area corresponding to a maximum size of the electronic data that is set to be processed by the printing apparatus after reception of the electronic data is started and sequentially store the received electronic data for each secured storage area;
    an updating unit configured to update the size of the secured storage area from the maximum size of the electronic data that is set to be processed by the printing apparatus to an actual size of the electronic data having been received completely; and
    a calculation unit configured to calculate a free space in the storage unit,
    wherein the calculation unit calculates the free space after the updating by the updating unit, and
    wherein the storage unit secures the storage area in a case where a size of the free space after the updating calculated by the calculation unit is not less than the maximum size of the electronic data that is set to be processed by the printing apparatus,
    wherein the storage unit does not secure the storage area until the size of the free space becomes not less than the maximum size of the electronic data that is set to be processed by the information processing apparatus by the updating by the updating unit.

6. An information processing apparatus configured to perform predetermined processing for received electronic data, comprising:
    a storage unit configured to secure a storage area corresponding to a maximum size of the electronic data that is set to be processed by the printing apparatus after reception of the electronic data is started and sequentially store the received electronic data for each secured storage area;
    an updating unit configured to update the size of the secured storage area from the maximum size of the electronic data that is set to be processed by the information processing apparatus to an actual size of the electronic data having been received completely; and a calculation unit configured to calculate a free space in the storage unit, wherein the calculation unit calculates the free space after the updating by the updating unit, and wherein the storage unit secures the storage area in a case where a size of the free space after the updating calculated by the calculation unit is not less than the maximum size of the electronic data that is set to be processed by the information processing apparatus, wherein the storage unit secures the free space as a part of the storage area in a case where the size of the free space is less than the maximum size of the electronic data that is set to be processed by the information processing apparatus, and adds the free space after the updating by the updating unit to the secured storage area until the size of the free space reaches the maximum size of the electronic data that is set to be processed by the information processing apparatus.

7. A method for controlling an information processing apparatus configured to perform predetermined processing for received electronic data, the method comprising:

securing, in a storage unit, a storage area corresponding to a maximum size of the electronic data that is set to be processed by the information processing apparatus after reception of the electronic data is started and sequentially storing the received electronic data for each secured storage area;

updating the size of the secured storage area from the maximum size of the electronic data that is set to be processed by the information processing apparatus to an actual size of the electronic data having been received completely; and calculating a free space in the storage unit, wherein the calculating the free space is performed after the updating, and wherein the storage area is secured in a case where a size of the free space after the updating calculated by the calculating is not less than the maximum size of the electronic data that is set to be processed by the information processing apparatus, wherein the storage area is not secured until the size of the free space becomes not less than the maximum size of the electronic data that is set to be processed by the information processing apparatus by the updating.

8. A method for controlling a printing apparatus that executes a print job for received electronic data, the method comprising:

securing, in a storage unit, a storage area corresponding to a maximum size of the electronic data that is set to be processed by the printing apparatus after reception of the electronic data is started and sequentially storing the received electronic data for each secured storage area;

updating the size of the secured storage area from the maximum size of the electronic data that is set to be processed by the printing apparatus to an actual size of the electronic data having been received completely; and calculating a free space in the storage unit, wherein the calculating the free space is performed after the updating, and wherein the storage area is secured in a case where a size of the free space after the updating calculated by the calculating is not less than the maximum size of the electronic data that is set to be processed by the printing apparatus, wherein the storage area is not secured until the size of the free space becomes not less than the maximum size of the electronic data that is set to be processed by the information processing apparatus by the updating.

* * * * *